(12) United States Patent
Depta et al.

(10) Patent No.: US 11,851,208 B2
(45) Date of Patent: Dec. 26, 2023

(54) AIRCRAFT ANTI-COLLISION LIGHT, AIRCRAFT COMPRISING AN AIRCRAFT ANTI-COLLISION LIGHT, AND METHOD OF OPERATING AN AIRCRAFT ANTI-COLLISION LIGHT

(71) Applicant: Goodrich Lighting Systems GmbH & Co. KG, Lippstadt (DE)

(72) Inventors: Marion Depta, Lippstadt (DE); Carsten Pawliczek, Lippstadt (DE); Andreas Ueberschaer, Guetersloh (DE); Bjoern Schallenberg, Geseke (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/700,772

(22) Filed: Mar. 22, 2022

(65) Prior Publication Data
US 2022/0306317 A1    Sep. 29, 2022

(30) Foreign Application Priority Data
Mar. 25, 2021  (EP) .................................... 21165080

(51) Int. Cl.
*B64D 47/06*    (2006.01)
*F21V 5/00*    (2018.01)
(Continued)

(52) U.S. Cl.
CPC ............. *B64D 47/06* (2013.01); *F21V 5/007* (2013.01); *F21Y 2105/18* (2016.08); *F21Y 2113/10* (2016.08)

(58) Field of Classification Search
CPC ...... B64D 47/06; F21Y 2105/18; F21S 43/26; F21W 2103/15
See application file for complete search history.

(56) References Cited

U.S. PATENT DOCUMENTS 5,685,637 A * 11/1997 Chapman ............... H05B 47/00
                                                        362/228
7,758,210 B2    7/2010 Peck
(Continued)

OTHER PUBLICATIONS

European Search Report for Application No. 21165080.9, dated Sep. 28, 2021, 9 pages.

*Primary Examiner* — Tracie Y Green
*Assistant Examiner* — Michael Chiang
(74) *Attorney, Agent, or Firm* — CANTOR COLBURN LLP (57) ABSTRACT

An aircraft anti-collision light includes a first group of light sources arranged in a first annular configuration around an axis (A) and a second group of light sources arranged in a second annular configuration. The first group of light sources is surrounded by the second group of light sources. The light also has a first lens structure, which is configured for generating a first light output from light emitted by the first group of light sources, a second lens structure, which is configured for generating a second light output from light emitted by the second group of light sources, and a light transmissive cover, which is arranged over the first lens structure and the second lens structure and which passes the first light output and the second light output for emitting a total light output.

17 Claims, 4 Drawing Sheets

(51) Int. Cl.
  *F21Y 105/18*  (2016.01)
  *F21Y 113/10*  (2016.01)

(56) References Cited

U.S. PATENT DOCUMENTS

| | | | |
|---|---|---|---|
| 8,454,212 B2* | 6/2013 | Fabbri | B64D 47/06 |
| | | | 362/346 |
| 8,851,718 B2 | 10/2014 | Jha et al. | |
| 9,239,288 B1* | 1/2016 | Wilkinson | F21V 13/04 |
| 10,150,575 B2 | 12/2018 | Franich | |
| 10,246,199 B2 | 4/2019 | Millet et al. | |
| 10,704,765 B2 | 7/2020 | Shellhause et al. | |
| 10,793,288 B2 | 10/2020 | Pawliczek et al. | |
| 2006/0007012 A1* | 1/2006 | Machi | H05B 47/235 |
| | | | 340/815.45 |
| 2010/0027281 A1* | 2/2010 | Waters | H05B 45/10 |
| | | | 340/961 |
| 2015/0183525 A1* | 7/2015 | De Jager | F21V 5/08 |
| | | | 340/983 |
| 2018/0220508 A1* | 8/2018 | Pilat | F21S 8/061 |
| 2019/0264891 A1* | 8/2019 | Wang | F21V 5/046 |
| 2019/0291894 A1* | 9/2019 | Hessling-Von Heimendahl | |
| | | | B64D 47/06 |
| 2019/0382132 A1* | 12/2019 | Jha | B64D 47/06 |
| 2020/0331629 A1 | 10/2020 | Hessling-Von Heimendahl et al. | |
| 2021/0293395 A1* | 9/2021 | Calvin | F21V 5/045 |
| 2021/0315357 A1* | 10/2021 | Kim | F21V 33/004 |

* cited by examiner

AIRCRAFT ANTI-COLLISION LIGHT, AIRCRAFT COMPRISING AN AIRCRAFT ANTI-COLLISION LIGHT, AND METHOD OF OPERATING AN AIRCRAFT ANTI-COLLISION LIGHT

CROSS-REFERENCE TO RELATED APPLICATIONS

This application claims priority to European Patent Application No. 21165080.9 filed Mar. 25, 2021, the entire contents of which is incorporated herein by reference.

TECHNICAL FIELD

The present invention is in the field of exterior aircraft lights. The present invention is in particular related to an aircraft anti-collision light, to an aircraft comprising such an aircraft anti-collision light, and to a method of operating an aircraft anti-collision light.

BACKGROUND

Almost all aircraft are equipped with exterior aircraft lights. In particular, large passenger air planes have a wide variety of exterior aircraft lights. Examples of such exterior aircraft lights include take-off and/or landing lights, taxi lights, navigation lights and anti-collision lights.

The term "anti-collision light" is a generic term, which encompasses the red flashing beacon lights, typically mounted above and below the fuselage of an aircraft, and the white flashing strobe lights, typically mounted at the wing tips and the tail of an aircraft.

In order to fulfill the requirements of light distribution and light intensity, aircraft anti-collision lights frequently comprise a vertically stacked arrangement of light emitters with attached optics. As a result, such aircraft anti-collision lights protrude from the outer periphery of the aircraft, which deteriorates the aerodynamic properties of the aircraft resulting in increased fuel consumption.

SUMMARY

Accordingly, it would be beneficial to provide an improved aircraft anti-collision light, which has a reduced impact on the aerodynamic properties of the aircraft.

Exemplary embodiments of the invention include an aircraft anti-collision light, comprising a first group of light sources, arranged in a first annular configuration around an axis A, and a second group of light sources arranged in a second annular configuration. The first group of light sources is surrounded by the second group of light sources. The first and second groups of light sources are in particular arranged substantially in a common plane.

The second annular configuration may be arranged in a coaxial manner with the first annular configuration around the same axis. However, it is also possible that first and second annular configurations are not concentric. They may in particular have offset and/or tilted center axes.

The aircraft anti-collision light further comprises a first lens structure, a second lens structure and a light transmissive cover. The first lens structure is configured for generating a first light output from light emitted by the first group of light sources, and the second lens structure is configured for generating a second light output from light emitted by the second group of light sources. The light transmissive cover is arranged over the first and second lens structures and passes the first light output and the second light output for emitting a total light output. The total light output has a peak light intensity in an angular range of between 80° and 90° with respect to the axis A.

Exemplary embodiments of the invention further include an aircraft comprising at least one aircraft anti-collision light according to an exemplary embodiment of the invention. The aircraft may be an air plane or a rotorcraft. The aircraft may in particular comprise a first anti-collision light, arranged on a top portion of a fuselage of the aircraft, and a second anti-collision light, arranged on a bottom portion of the fuselage of the aircraft.

Exemplary embodiments of the invention further include a method of operating an aircraft anti-collision light, comprising: generating a first light output from light emitted by a first group of light sources, arranged in a first annular configuration around an axis, with a first lens structure; generating a second light output from light emitted by a second group of light sources, arranged in a second annular configuration surrounding the first group of light sources, with a second lens structure; and passing the first light output and the second light output through a light transmissive cover and emitting a total light output from the aircraft anti-collision light; wherein the total light output has its peak light intensity in an angular range of between 80° and 90° with respect to the axis.

As in an aircraft anti-collision light according to an exemplary embodiment of the invention the first and second groups of light sources are arranged in nested annular configurations, the aircraft anti-collision light may have a low geometric profile. This may in particular be the case, when the first and second groups of light sources are arranged in a common plane/substantially in a common plane. The low geometric profile may result in advanced aerodynamic properties of the aircraft anti-collision light. An aircraft anti-collision light according to an exemplary embodiment of the invention may be able to provide a total light output, which fulfills the requirements of light distribution and light intensity of aircraft anti-collision lights, at a low geometric profile.

By arranging the first and second groups of light sources in annular configurations, a free space may be formed at the center of the aircraft anti-collision light. Said free space may be used for arranging additional components, such as a controller, a power supply, an antenna or a sensor, resulting in a space saving configuration.

According to an embodiment, the first group of light sources includes 10 to 30, in particular 20, light sources, and/or the second group of light sources includes 30 to 50, in particular 40, light sources. These numbers are only exemplary, and the number of light sources in each group may be varied in order to fulfill the respective requirements/ to achieve the respectively desired light output.

According to an embodiment, the light sources are LEDs.

According to an embodiment, the first and second groups of light sources and/or the first and second lens structures are arranged on a common mounting plate. An aircraft anti-collision light comprising a common mounting plate reduces the number of process steps necessary for mounting the aircraft anti-collision light to an aircraft. As a result, the process of mounting the aircraft anti-collision light to the aircraft is facilitated. Using the same mounting plate for the first and second groups of light sources and/or for the first and second lens structures may contribute to the low geometric profile of the aircraft anti-collision light.

According to an embodiment, the light transmissive cover is attached to the common mounting plate as well. Such a configuration facilitates the mounting of the aircraft anti-collision light to the aircraft even further.

According to an embodiment, the aircraft anti-collision light is configured for generating a rotationally symmetric light output, as it is often required for aircraft anti-collision lights. In other words, total light output of the aircraft anti-collision light may be rotationally symmetric. The aircraft anti-collision light may in particular be configured for generating a light output which is rotationally symmetric with respect to the axis A of the aircraft anti-collision light. The first group of light sources and/or the second group of light sources may be arranged in a rotationally symmetric manner.

According to an embodiment, the light transmissive cover includes a third lens structure which is configured for generating the total light output from the first and second light outputs. A third lens structure adds further options for forming the total light output of the aircraft anti-collision light. As a result, the total light output of the aircraft anti-collision light may be adjusted even better to the needs and requirements.

According to an embodiment, the aircraft anti-collision light has a first dimension extending in a direction parallel to the axis A, and a second dimension extending perpendicular to the axis A. According to an embodiment, the first dimension is in a range of between 5% and 15%, in particular in a range of between 8% and 12%, further in particular approximately 10%, of the second dimension. Such a configuration may provide a flat aircraft anti-collision light having a small wind resistance. This may result in beneficial aerodynamic properties of the aircraft anti-collision light, when mounted to an aircraft.

According to an embodiment, the first dimension is in the range of between 5 mm and 15 mm, in particular in the range of between 8 mm and 12 mm, more particularly approximately 10 mm, and/or the second dimension is in the range of between 50 mm and 150 mm, in particular in the range of between 80 mm and 120 mm, more particularly approximately 100 mm.

Such dimensions have been found as beneficial for providing a flat aircraft anti-collision light, having a small wind resistance, while still being able to fulfill the requested requirements of light distribution and light intensity.

According to an embodiment, the total light output has its peak light intensity in an angular range of between 85° and 90° with respect to the axis A.

According to an embodiment, the intensity of the total light output does not exceed 20% of the peak light intensity in an angular range of less than 60° with respect to the axis A and/or the intensity of the total light output does not exceed 40% of the peak light intensity in an angular range of less than 70° with respect to the axis A.

According to an embodiment, the peak light intensity of the total light output is at least 150 cd, when the aircraft anti-collision light is configured to be mounted to a rotorcraft, and the peak light intensity of the total light output is at least 400 cd, when the aircraft anti-collision light is configured to be mounted to an air plane.

A light output having these properties fulfills statutory provisions of light distribution and intensity requested for aircraft anti-collision lights. In particular, a light output having such values may fulfill the Federal Aviation Regulations (FAR) § 25.1401 for air planes and the FAR § 29.1401 for rotorcraft.

According to an embodiment, the aircraft anti-collision light comprises light sources of a first type, which are configured for emitting light of a first color, and light sources of a second type, which are configured for emitting light of a second color. A configuration comprising at least two different types of light sources may allow for employing the aircraft anti-collision light as a multiple purpose light, which is capable to emit light of at least two different colors.

According to an embodiment, the light sources of the first group of light sources are of the first type, and the light sources of the second group of light sources are of the second type.

According to an alternative embodiment, at least one of the first and the second groups of light sources comprises different types of light sources, so that said group of light sources may emit light of different colors by selectively activating the light source of the different types.

The at least two different colors may be white and red, in particular aviation white and aviation red.

According to an embodiment, the aircraft anti-collision light is at least one of a red-flashing beacon light and a white strobe anti-collision light. In other words, the aircraft anti-collision light may be configured to emit red light flashes and/or white light flashes in operation.

When the aircraft anti-collision light is operated in a flashing mode of operation, light sources emitting light of different colors may by activated and deactivated in an alternating manner. This may result in a substantially uniform power consumption and may avoid peaks in the power consumption which would occur if all light sources would be activated concurrently.

According to an embodiment, at least one of the first lens structure, the second lens structure and the light transmissive cover is made of a synthetic material, in particular a material including silicone. A synthetic material, in particular a material including silicone, may provide the desired optical and mechanical properties, and it may be manufactured, processed and shaped easily, e.g. by molding. The first lens structure and/or the second lens structure and/or the light transmissive cover may also be made from other suitable light transmissive/refractive materials, such as PMMA.

According to an embodiment, the first and second lens structures and the light transmissive cover are formed from the same light transmissive material. Such a configuration may be manufactured easily, as only a single type of light transmissive material needs to be provided.

According to an embodiment, the first and second lens structures and the light transmissive cover are formed from at least two different light transmissive materials, in order to allow for optimizing their respective optical and mechanical properties to the respective use. The light transmissive cover, for example, may be formed from a more rigid and/or a more durable light transmissive material than the first and second lens structures, in order to provide an improved protection against dirt, dust, water, moisture and mechanical impact.

According to an embodiment, the aircraft anti-collision light further comprises at least one additional group of light sources arranged in a further annular configuration and at least one additional lens structure, which is configured for generating an additional light output from light emitted by the at least one additional group of light sources. In such an embodiment, the at least one additional group of light sources may be surrounded by the first and second groups of light sources. Adding at least one additional annular configuration of light sources may allow for increasing the total light output of the aircraft anti-collision light, without deteriorating its aerodynamic properties.

The total intensity of light emitted by the aircraft anti-collision light may be scalable without increasing the height of the aircraft anti-collision light by adjusting the number of annular configurations of light sources and/or by adjusting the number of light sources within each annular configuration.

BRIEF DESCRIPTION OF THE DRAWINGS

Further exemplary embodiments of the invention are described below with respect to the accompanying drawings, wherein.

DETAILED DESCRIPTION

Figure 1:
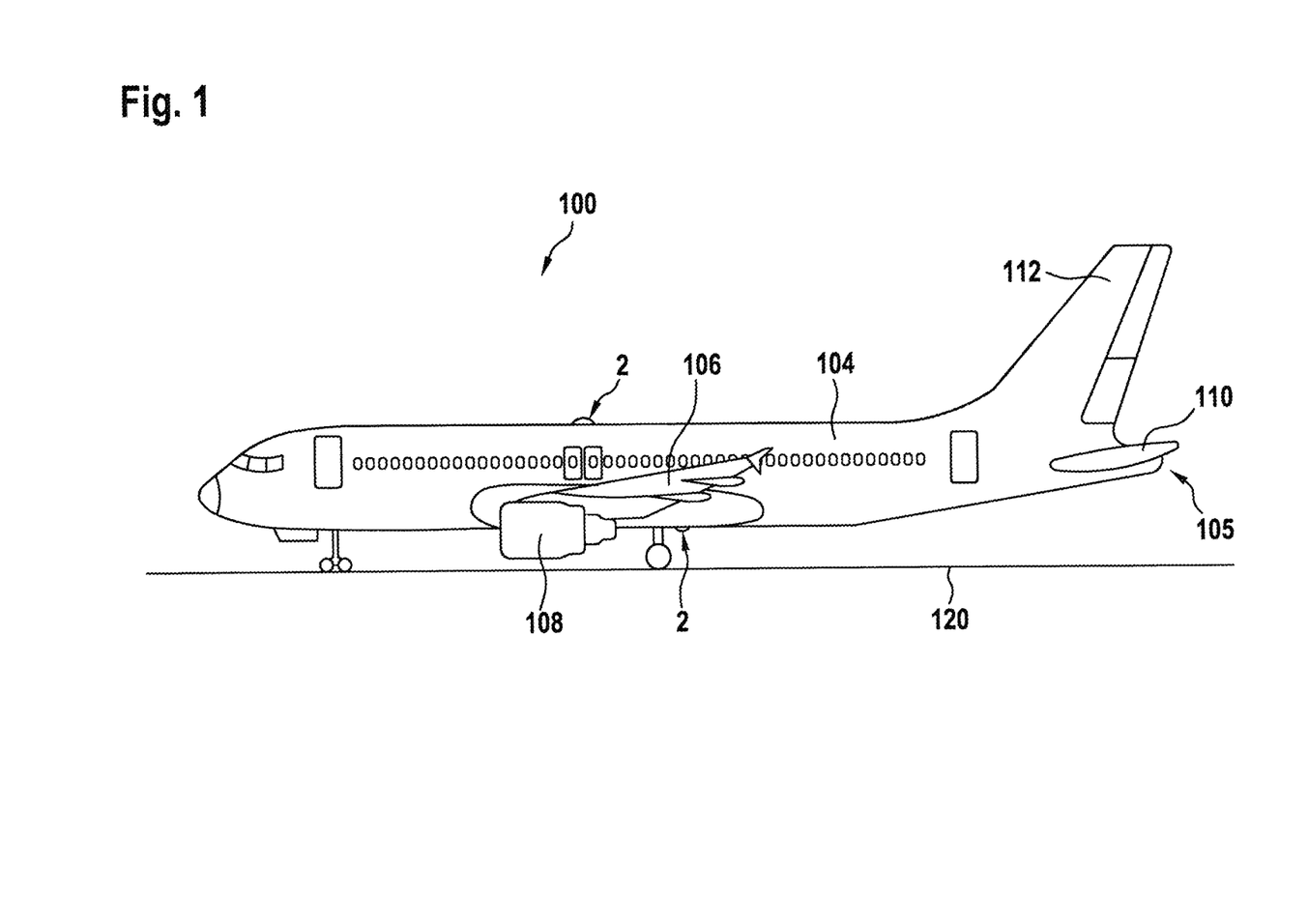
FIG. 1 depicts a schematic side view of an air plane in accordance with an exemplary embodiment of the invention, which is equipped with two aircraft anti-collision lights according to exemplary embodiments of the invention.

FIG. 1 depicts a schematic side view of an aircraft 100 in accordance with an exemplary embodiment of the invention, which is equipped with two aircraft anti-collision lights 2 according to exemplary embodiments of the invention.

The aircraft 100 has a fuselage 104 and two wings 106, which are attached to the right and left sides of the fuselage 104. Each of the wings 106 carries an engine 108. Further, two horizontal stabilizers 110 and a vertical stabilizer 112 are mounted to a tail portion of the fuselage 104. In the schematic side view depicted in FIG. 1, only one of the two wings 106, the two engines 108 and the two horizontal stabilizers 110 is visible, respectively. It is pointed out that aircraft in accordance with other designs and constructions are encompassed by exemplary embodiments of the present invention as well.

The aircraft 100 further comprises two aircraft anti-collision lights 2, mounted to the fuselage 104. An upper aircraft anti-collision light 2 is mounted to a top portion (roof) of the fuselage 104. A lower aircraft anti-collision light 2 is mounted to a bottom portion (belly) of the fuselage 104.

The aircraft 100 shown in FIG. 1 is an air plane 100, in particular a large commercial passenger or cargo air plane 100. It is pointed out that other types of aircraft, such as smaller air planes 100, may be equipped with aircraft anti-collision lights 2 in accordance with exemplary embodiments of the invention as well.

Figure 2:
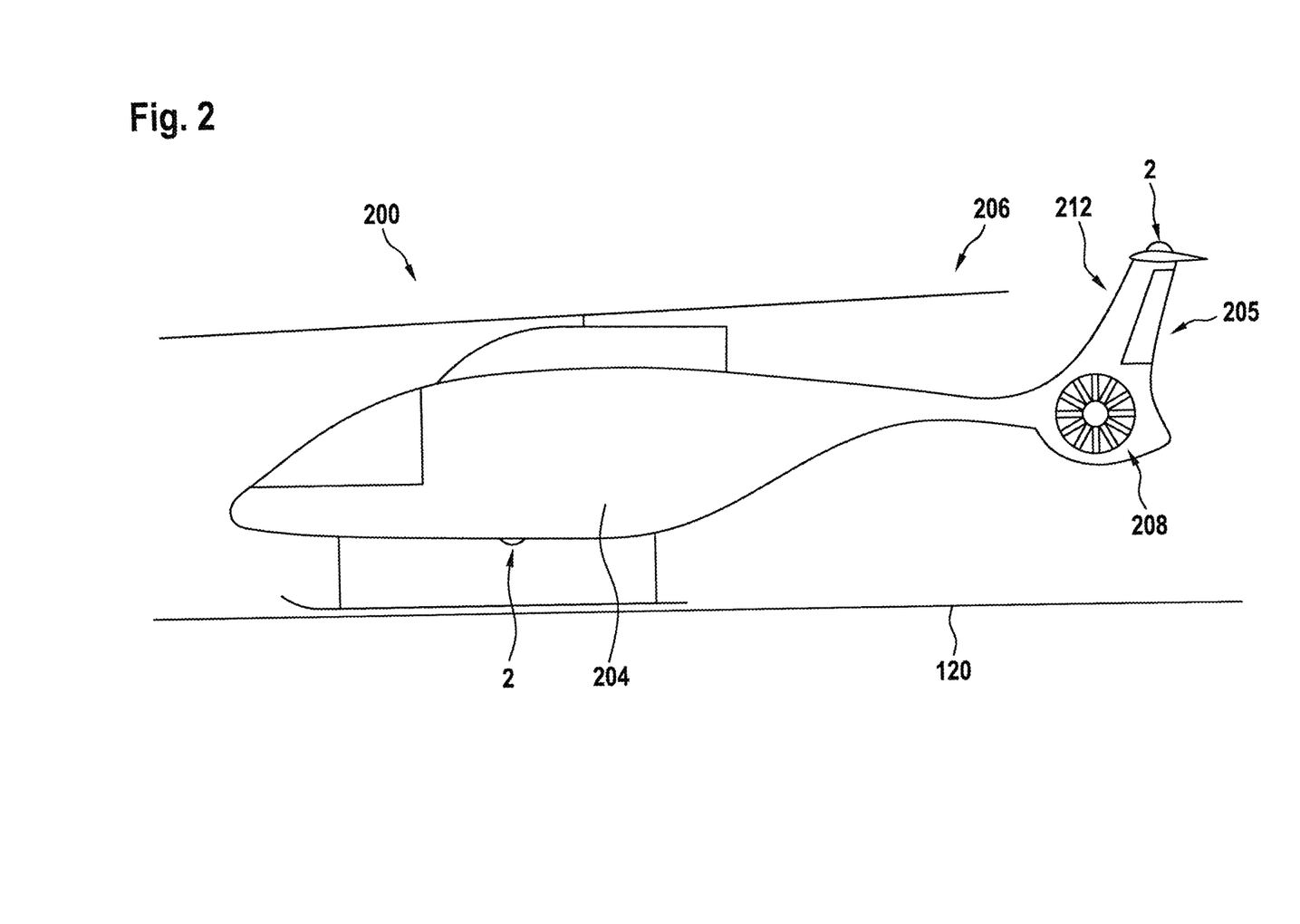
FIG. 2 depicts a schematic side view of a rotorcraft in accordance with an exemplary embodiment of the invention, which is equipped with two aircraft anti-collision lights according to exemplary embodiments of the invention.

FIG. 2 shows a schematic side view of another aircraft 200, in particular of a rotorcraft (helicopter) 200, having a fuselage 204 and two rotors 206, 208.

A lower aircraft anti-collision light 2 according to an exemplary embodiment of the invention is mounted to a bottom portion (belly) of the fuselage 204. An upper aircraft anti-collision light 2 is mounted to the top of a vertical stabilizer 212 at the tail 205 of the rotorcraft 200.

The upper and lower aircraft anti-collision lights 2, shown in FIGS. 1 and 2, may be aircraft beacon lights 2, which are configured for emitting flashes of red light in operation, in order to provide a beacon light behavior, as it is expected by other aircraft, ground personnel and air space control. In particular, the aircraft beacon lights 2 may emit flashes of aviation red light, with the flashes of aviation red light indicating that the engines 108 of the aircraft 100 are running.

Aircraft anti-collision lights 2 in accordance with exemplary embodiments of the invention may also be white strobe anti-collision lights, emitting flashes of white light. When embodied as white strobe anti-collision lights, the aircraft anti-collision lights 2 in accordance with exemplary embodiments of the invention may be provided at the wings 106, in particular the wing tips, of the aircraft 100.

Although only two aircraft anti-collision lights 2 are shown in FIGS. 1 and 2, respectively, an aircraft 100, 200 may comprise more than two aircraft anti-collision lights 2. An aircraft 100, 200 may in particular comprise a combination of aircraft beacon lights and aircraft anti-collision lights, and at least some of the aircraft anti-collision lights may be mounted to the wings 106 and/or to the stabilizers 110, 112, 212 and/or to the tail 105, 205 of the aircraft 100, 200. Not all aircraft anti-collision lights 2 of the aircraft 100 need to be aircraft anti-collision lights 2 according to exemplary embodiments of the invention.

Aircraft anti-collision lights 2 in accordance with exemplary embodiments of the invention may further be combined aircraft anti-collision lights 2, providing the combined functionalities of a red-flashing aircraft beacon light and a white-flashing strobe anti-collision light.

The upper and lower aircraft anti-collision lights 2, depicted in FIGS. 1 and 2, are formed in accordance with exemplary embodiments of the invention, the details of which will be described in the following with reference to FIGS. 3 to 6.

Figure 3:
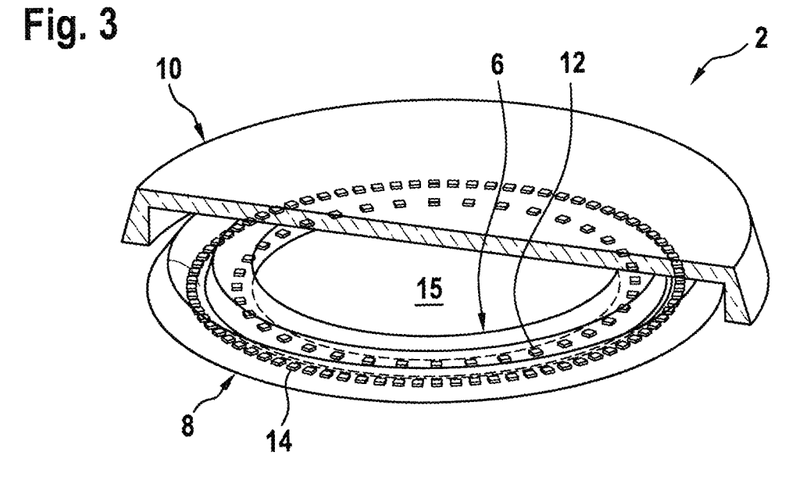
FIG. 3 depicts a partially cut-open perspective view of an aircraft anti-collision light according to an exemplary embodiment of the invention.
Figure 4:
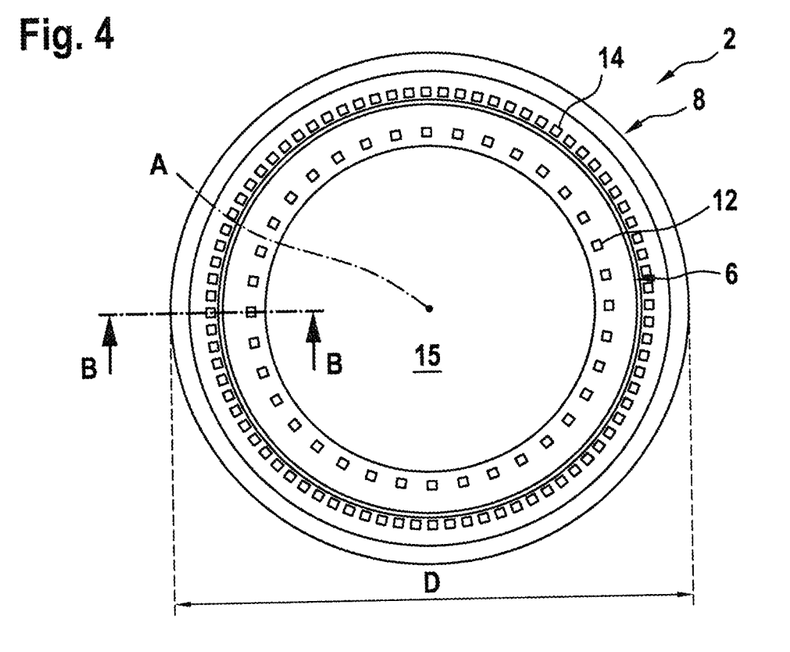
FIG. 4 depicts a top view of the aircraft anti-collision light depicted in FIG. 3.
Figure 5:
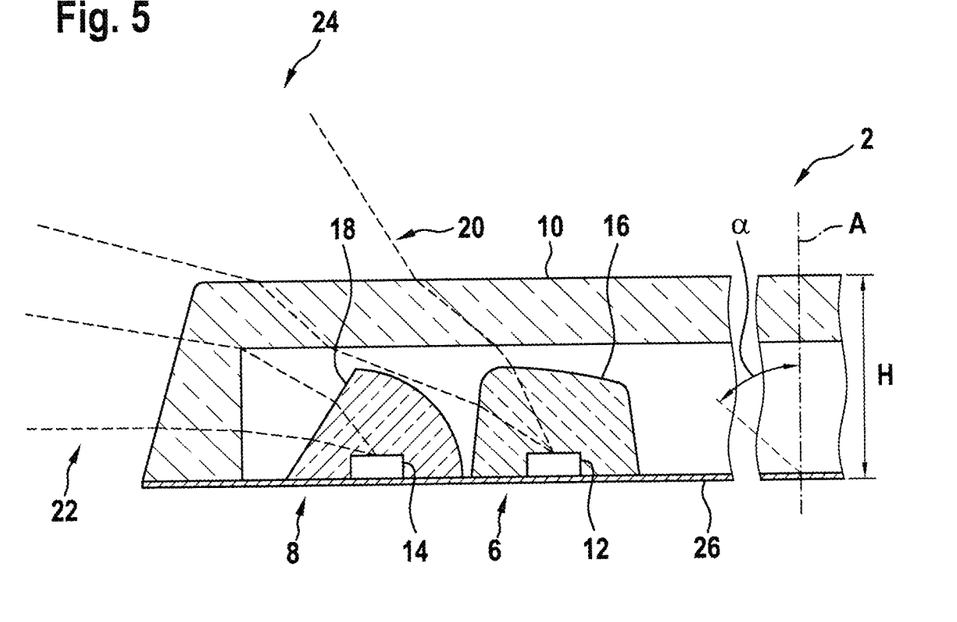
FIG. 5 depicts a cross-sectional view along line B-B drawn in FIG. 4.

FIG. 3 depicts a perspective, partially cut-open view of an aircraft anti-collision light 2 according to an exemplary embodied of the invention. FIG. 4 depicts a top view thereof, and FIG. 5 depicts a cross-sectional view along line B-B drawn in FIG. 4.

The aircraft anti-collision light 2 comprises a first (inner) support ring 6 supporting a first group of light sources 12, which are arranged in a first annular configuration around an axis A.

The aircraft anti-collision light 2 further comprises a second (outer) support ring 8 supporting a second group of light sources 14, which are arranged in a second annular configuration, so the first support ring 6 and the first group of light sources 12 are surrounded by the second support ring 8 and the second group of light sources 14.

The light sources 12, 14 may be LEDs.

The first group of light sources 12 may include 10 to 30, in particular 20, light sources, and the second group of light sources 14 may include 30 to 50, in particular 40, light sources. These numbers of light sources 12, 14 are, however, only exemplary, and the number of light sources 12, 14 in each group may be varied in order to fulfill the respective requirements and/or to achieve desired light outputs.

In the exemplary embodiment depicted in FIGS. 3 to 5, the first and second support rings 6, 8 are formed as circles, which coaxially extend around the common axis A. This is, however, only an exemplary configuration. Generally, the first and second support rings 6, 8 need not to extend along a circular line. Instead, they may have alternative shapes, for example elliptical or polygonal shapes. Further, the first and second support rings 6, 8 in general do not need to be arranged in a coaxial manner with respect to each other and with respect to a common axis A.

By arranging the first and second groups of light sources 12, 14 in annular configurations, a free space 15 is formed around the axis A. Said free space 15 may be used for arranging additional components (not shown), such as a controller, a power supply or a sensor, resulting in enhanced functionality and/or a space saving configuration of the aircraft anti-collision light 2.

The aircraft anti-collision light 2 further comprises a first lens structure 16 and a second lens structure 18, formed of a light transmissive material.

The first lens structure 16 is shaped for generating a first light output 20 from the light emitted by the first group of light sources 12. The second lens structure 18 is shaped for generating a second light output 22 from the light emitted by the second group of light sources 14 (see FIG. 5). The first and second lens structures 16, 18 are refractive optical elements that transform the light output, as emitted by the first and second groups of light sources 12, 14, into the first and second light outputs 20, 22. The first and second lens structures 16, 18 help in shaping the total light output of the aircraft anti-collision light 2.

The first and second lens structures 16, 18 may be provided as first and second lens structure rings 16, 18, extending along and being supported by the first and second support rings 6, 8, respectively.

The first and second support rings 6, 8 and the first and second lens structures 16, 18 are covered by a light transmissive cover 10. The light transmissive cover 10 protects the first and second groups of light sources 12, 14 and the first and second lens structures 16, 18 from adverse external influences, such as dirt, dust, water, moisture and mechanical impact.

The first and second support rings 6, 8 and the light transmissive cover 10 are arranged on a common mounting plate 26, which is configured to be mounted to an aircraft 100, 200, as it is depicted in FIGS. 1 and 2.

The light transmissive cover 10 passes the first light output 20 and the second light output 22, which have been shaped by the first and second lens structures 16, 18. As a result, the aircraft anti-collision light 2 emits a total light output 24, which is a combination of the first and second light outputs 20, 22.

In further embodiments, which are not explicitly shown in the figures, the aircraft anti-collision light 2 may comprise at least one additional support ring arranged inside the first support ring 6 and/or outside the second support ring 8 and supporting an additional group of light sources and an additional lens structure. By providing an additional support ring with additional light sources, the intensity of the total light output 24, emitted by the aircraft anti-collision light 2, may be increased.

The first and second lens structures 16, 18 and the light transmissive cover 10 may be formed from a light transmissive synthetic material, in particular from a material including silicone, which may be brought into the desired shape by molding.

The first and second lens structures 16, 18 and the light transmissive cover 10 may be formed from the same light transmissive material or they may be formed from at least two different light transmissive materials.

The light transmissive cover 10 may in particular be formed from a more rigid and/or a more durable light transmissive material than the first and second lens structures 16, 18, in order to provide the desired protection against dirt, dust, water, moisture and mechanical impact.

The light transmissive cover 10 may be shaped so that it forms a third lens structure which modifies the first and second light outputs 20, 22 for generating the total light output 24 of the aircraft anti-collision light 2. Integrating a third lens structure into the light transmissive cover 10 may add further options for forming the total light output 24 of the aircraft anti-collision light 2. In consequence, the total light output 24 of the aircraft anti-collision light 2 may be adjusted even better to the requested requirements and/or to desired light output characteristics.

The aircraft anti-collision light 2 emits the total light output 24 predominantly in lateral directions, i.e. in directions which extend in a plane parallel to the ground 120, when the aircraft 100, 200 is located on the ground 120, as depicted in FIGS. 1 and 2.

The aircraft anti-collision light 2 of the exemplary embodiment of FIGS. 3 to 5 is configured for generating a total light output 24 having rotational symmetry, so that the aircraft anti-collision light 2 is visible from all spatial directions around an aircraft. The total light output 24, as emitted by an aircraft anti-collision light 2 according to the exemplary embodiment shown in FIGS. 3 to 5, has a rotational symmetry with respect to the axis A.

Figure 6:
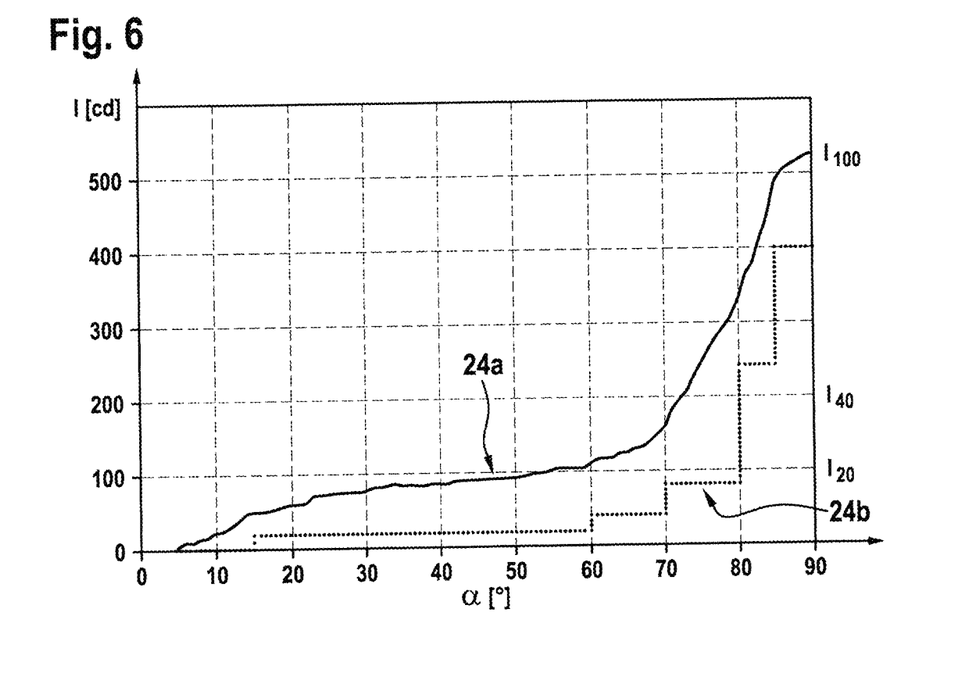
FIG. 6 depicts two graphs illustrating the light intensity of the total light output, as emitted by an aircraft anti-collision light according to an exemplary embodiment of the invention, and the effective light intensities required for aircraft anti-collision light systems as a function of the angle with respect to an axis of the aircraft anti-collision light.

FIG. 6 shows a graph 24a (solid curve) illustrating the light intensity I of the total light output 24, emitted by an aircraft anti-collision light 2 according to an exemplary embodiment of the invention, in particular by an aircraft anti-collision light 2 configured to be mounted to an airplane 100.

The dotted step curve 24b illustrates the effective light intensities required for aircraft anti-collision light systems by the US Federal Aviation Regulations § 25.1401.

FIG. 6 shows that the total light output 24 of an aircraft anti-collision light 2 according to an exemplary embodiment of the invention has its peak light intensity I100 of approximately 500 cd in an angular range of between $80°<\alpha<90°$, in particular in an angular range of between $85°<\alpha<90°$, wherein a is the angle between the axis A and the respective spatial direction.

For air planes 100, FAR § 25.1401 requires a peak light intensity I100 of at least 400 cd.

FIG. 6 further shows that in an angular range between 0° and 60° with respect to the axis A, the intensity I of the total light output 24 does not exceed 120=100 cd, i.e. the intensity I of the total light output 24 is less than 20% of the peak light intensity I100 of approximately 500 cd.

In an angular range between 0° and 70° with respect to the axis A, the intensity I of the total light output 24 does not exceed 140=200 cd, i.e. the intensity I of the total light output 24 is less than 40% of the peak light intensity I100 of approximately 500 cd.

In FAR § 29.1401, a different light intensity distribution (not shown) is required for rotorcraft 200. By appropriately modifying the configuration of the light sources 12, 14, the first and second lens structure 16, 18 and/or the light transmissive cover 10, the aircraft anti-collision light 2 may be adapted for providing a total light output 24 which fulfills the requirements for rotorcraft 200.

The aircraft anti-collision light 2 has a first dimension (height) H extending in a direction parallel to the axis A (see FIG. 5), and a second dimension (diameter) D extending in a direction, which is perpendicular to the axis A (see FIG. 4).

The aircraft anti-collision light 2 may be referred to as a "flat" aircraft anti-collision light 2, i.e. an aircraft anti-collision light 2 having a first dimension H which is less than 15% of the second dimension D. The first dimension H, for example, may be in a range of between 5% and 15%, in particular of between 8% and 12%, more particularly about 10% of the second dimension D.

A "flat" aircraft anti-collision light 2, in which the first dimension H is smaller than 15% of the second dimension D, has a small wind resistance, in particular a smaller wind resistance than conventional aircraft anti-collision lights. In consequence, a "flat" aircraft anti-collision light 2 according to an embodiment of the invention may result in improved aerodynamics of the aircraft 100, 200, to which the flat aircraft anti-collision light 2 is mounted.

In an exemplary embodiment of a flat aircraft anti-collision light 2, the first dimension H is in the range of between 5 mm and 15 mm, in particular in the range of between 8 mm and 12 mm, more particularly approximately 10 mm, and/or the second dimension D is in the range of between 50 mm and 150 mm, in particular in the range of between 80 mm and 120 mm, more particularly about 100 mm.

Such dimensions of the flat aircraft anti-collision light 2 have been found suitable for simultaneously providing the desired total light output 24 and beneficial aerodynamic properties.

All light sources 12, 14 of the aircraft anti-collision light 2 may be configured for emitting light of the same color, resulting in a "single color" total light output 24 of the aircraft anti-collision light 2.

The light sources 12, 14 of such "single color" aircraft anti-collision lights 2 may be configured for emitting white light, in order to provide a white strobe anti-collision light, which is operated in a flashing mode.

Alternatively, the light sources 12, 14 of "single color" aircraft anti-collision lights 2 may be configured for emitting red light, in order to provide a red-flashing beacon light.

In an alternative embodiment, the aircraft anti-collision light 2 may comprise at least two different types of light sources 12, 14, which are configured for emitting light of different colors. An aircraft anti-collision light 2 comprising at least two different types of light sources 12, 14, which are configured for emitting light of different colors, may combine the functionalities of two aircraft anti-collision lights 2 in a single aircraft anti-collision light 2. Such an aircraft anti-collision light 2 may for example combine the functionalities of a red-flashing beacon light and a white strobe anti-collision light.

In an aircraft anti-collision light 2 comprising at least two different types of light sources 12, 14, which are configured for emitting light of different colors, the first group of light sources 12 may be configured for emitting light of a first color, and the light sources of the second group of light sources 14 may be configured for emitting light of a second color. In such a configuration, all light sources 12 supported by the first support ring 6 emit light of the first color, and all light sources 14 supported by second support ring 8 emit light of the second color.

In an alternative embodiment, the light sources 12, 14 emitting light of the first and second colors may be distributed over the first and second groups of light sources 12, 14. In other words, at least one of the first and the second groups of light sources 12, 14 may comprises different types of light sources 12, 14, so that said group of light sources 12, 14 may emit light of different colors.

In all configurations, the different types of light sources 12, 14 may be switchable independently of each other, in order to allow for selecting the color(s) of light emitted by the aircraft anti-collision light 2 by selectively activating the corresponding light sources 12, 14.

In all configurations, the light sources 12, 14 may be activated periodically when operated in a flashing mode of operation.

When the aircraft anti-collision light 2 is operated in a flashing mode of operation, light sources 12, 14 emitting light of different colors may by activated and deactivated in an alternating manner. This may result in a substantially uniform power consumption and may avoid peaks in the power consumption which would occur if all light sources 12, 14 would be activated concurrently.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft anti-collision light comprising:
a first group of light sources arranged in a first annular configuration around an axis (A);
a second group of light sources arranged in a second annular configuration, wherein the first group of light sources is surrounded by the second group of light sources;
a first lens structure, which is configured for generating a first light output from light emitted by the first group of light sources;
a second lens structure, which is configured for generating a second light output from light emitted by the second group of light sources; and
a light transmissive cover, which is arranged over the first lens structure and the second lens structure and which passes the first light output and the second light output for emitting a total light output;
wherein the total light output has its peak light intensity ($I_{100}$) in an angular range of between 80° and 90° with respect to the axis (A);
wherein the first lens structure is provided as a first lens structure ring, and
wherein the second lens structure is provided as a second lens structure ring surrounding the first lens structure ring;
wherein the light transmissive cover is shaped to form a third lens structure, which modifies the first and second light outputs for generating the total light output from the first and second light outputs;
wherein the aircraft anti-collision light has a first dimension (H) in a direction of the axis (A) and a second dimension (D) in a direction perpendicular to the axis (A);
wherein the first dimension (H) is in the range of between 5% and 15% of the second dimension (D);
wherein the first dimension (H) is in the range of between 5 mm and 15 mm; and
wherein the second dimension (D) is in the range of between 50 mm and 150 mm.

2. The aircraft anti-collision light according to claim 1, wherein the first annular configuration and the second annular configuration are arranged concentrically around the axis (A).

3. The aircraft anti-collision light according to claim 1, wherein the first and second groups of light sources are arranged on a common mounting plate or wherein the first and second lens structures are arranged on the common mounting plate.

4. The aircraft anti-collision light according to claim 1, wherein the total light output is rotationally symmetric with respect to the axis (A).

5. The aircraft anti-collision light according to claim 1, wherein the first dimension (H) is in the range of between 8 mm and 12 mm.

6. The aircraft anti-collision light according to claim 1, wherein the total light output has at least one of the following properties:
the total light output has its peak light intensity ($I_{100}$) in an angular range of between 85° and 90° with respect to the axis (A);
the light intensity of the total light output in an angular range of less than 60° with respect to the axis (A) does not exceed 20% of the peak light intensity ($I_{100}$);
the light intensity of the total light output in an angular range of less than 70° with respect to the axis (A) does not exceed 40% of the peak light intensity ($I_{100}$).

7. The aircraft anti-collision light according to claim 1, wherein the peak light intensity ($I_{100}$) of the total light output is at least 150 cd.

8. The aircraft anti-collision light according to claim 1, including a first type of light sources, which are configured for emitting light of a first color, and a second type of light sources, which are configured for emitting light of a second color.

9. The aircraft anti-collision light according to claim 8, wherein the first and second colors include white and red.

10. The aircraft anti-collision light according to claim 1, wherein at least one of the first lens structure, the second lens structure and the light transmissive cover is made of a synthetic material.

11. The aircraft anti-collision light according to claim 1, further comprising:
at least one additional group of light sources arranged in a further annular configuration; and
at least one additional lens structure, which is configured for generating an additional light output from light emitted by the at least one additional group of light sources;
wherein the first and second groups of light sources surround the at least one additional group of light sources.

12. The aircraft anti-collision light according to claim 1, wherein the aircraft anti-collision light is at least one of a red-flashing beacon light and a white strobe anti-collision light.

13. An aircraft comprising:
a first anti-collision light according to claim 1, arranged on a top portion of a fuselage of the aircraft; and
a second anti-collision light according to claim 1, arranged on a bottom portion of the fuselage of the aircraft.

14. Aircraft anti-collision light according to claim 1, further comprising
a first support ring supporting the first group of light sources and the first lens structure ring, and
a second support ring supporting the second group of light sources and the second lens structure ring.

15. The aircraft anti-collision light according to claim 1, wherein the peak light intensity ($I_{100}$) of the total light output is at least 400 cd.

16. The aircraft anti-collision light according to claim 1, wherein at least one of the first lens structure, the second lens structure and the light transmissive cover is made of a synthetic material including silicone.

17. A method of operating an aircraft anti-collision light, comprising:
generating a first light output from light emitted by a first group of light sources, arranged in a first annular configuration around an axis (A), with a first lens structure, wherein the first lens structure is a first lens structure ring;
generating a second light output from light emitted by a second group of light sources, arranged in a second annular configuration surrounding the first group of light sources, with a second lens structure, wherein the second lens structure is a second lens structure ring surrounding the first lens structure ring; and
passing the first light output and the second light output through a light transmissive cover and emitting a total light output from the aircraft anti-collision light, wherein the light transmissive cover is shaped to form a third lens structure, which modifies the first and second light outputs for generating the total light output from the first and second light outputs;
wherein the total light output has its peak light intensity ($I_{100}$) in an angular range of between 80° and 90° with respect to the axis (A);
wherein the aircraft anti-collision light has a first dimension (H) in a direction of the axis (A) and a second dimension (D) in a direction perpendicular to the axis (A);
wherein the first dimension (H) is in the range of between 5% and 15% of the second dimension (D);
wherein the first dimension (H) is in the range of between 5 mm and 15 mm; and
wherein the second dimension (D) is in the range of between 50 mm and 150 mm.

* * * * *